US012617281B1

(12) United States Patent　　　　　(10) Patent No.:　US 12,617,281 B1

Chen et al.　　　　　　　　　　　　(45) Date of Patent:　　May 5, 2026

(54) SYSTEMS AND METHODS FOR DISPLAYING CONTENT ON A SURFACE

(71) Applicant: Harman International Industries, Incorporated, Stamford, CT (US)

(72) Inventors: Zhijun Chen, Kanagawa (JP); Alex Manoulian, Jr., Detroit, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 18/935,546

(22) Filed: Nov. 3, 2024

(51) Int. Cl.
　　*B60K 35/23*　　　(2024.01)
　　*G02B 27/01*　　　(2006.01)
　　*G06T 3/18*　　　(2024.01)
　　*G06T 5/80*　　　(2024.01)
　　*G09G 3/00*　　　(2006.01)

(52) U.S. Cl.
　　CPC ............. *B60K 35/23* (2024.01); *G09G 3/002* (2013.01); *G09G 3/03* (2020.08); *B60K 2360/334* (2024.01); *G02B 27/01* (2013.01); *G02B 2027/014* (2013.01); *G06T 3/18* (2024.01); *G06T 5/80* (2024.01); *G09G 2340/14* (2013.01); *G09G 2380/10* (2013.01)

(58) Field of Classification Search
　　CPC .. B60K 35/23; B60K 2360/334; G09G 3/002; G09G 3/03; G09G 2340/14; G09G 2380/10; G02B 2027/011; G02B 2027/014; G02B 27/01; G06T 3/18; G06T 5/80
　　See application file for complete search history.

(56) References Cited

U.S. PATENT DOCUMENTS

| | | | | |
|---|---|---|---|---|
| 11,526,002 B2 * | 12/2022 | Imatoh | .............. | G02B 27/0101 |
| 11,756,170 B2 * | 9/2023 | Xie | ........... | G06T 5/60 |
| | | | | 382/157 |
| 2009/0278765 A1 * | 11/2009 | Stringfellow | ........ | H04N 9/3185 |
| | | | | 345/7 |
| 2010/0253601 A1 * | 10/2010 | Seder | .................... | G01S 13/723 |
| | | | | 345/7 |
| 2018/0157035 A1 * | 6/2018 | Fujita | .................. | G06V 20/597 |
| 2020/0355512 A1 * | 11/2020 | Cho | ..................... | G01C 21/365 |
| 2021/0209209 A1 * | 7/2021 | Gorsica | ................ | G06F 1/1626 |
| 2022/0107497 A1 * | 4/2022 | Murata | .................. | B60K 35/23 |
| 2022/0319365 A1 * | 10/2022 | Tsuji | ..................... | G09G 3/002 |
| 2024/0019695 A1 * | 1/2024 | Nagata | .................. | G02B 27/01 |

OTHER PUBLICATIONS

Extended European Search Report issued in corresponding EP Application 25211186.9, issued Dec. 2, 2025, 11 pages.

* cited by examiner

*Primary Examiner* — Douglas Wilson

(74) *Attorney, Agent, or Firm* — Burris Law, PLLC

(57)　　　　　　　ABSTRACT

A method includes the obtaining of curve data associated with a surface, the determination of a curve compensation corresponding to the curve data, and the causing of one or more images to be projected onto a portion of the surface by a plurality of display units associated with the display controller based on the curve compensation.

20 Claims, 5 Drawing Sheets

400

500

SYSTEMS AND METHODS FOR DISPLAYING CONTENT ON A SURFACE

FIELD

The present disclosure relates to displaying content on a surface, and more particularly to systems and methods for providing image compensation to the displayed content.

BACKGROUND

The statements in this section merely provide background information related to the present disclosure and may not constitute prior art.

Heads-up displays provided upon a windshield of a vehicle are an increasingly common feature that allow for an operator of the vehicle to view information related to operation of the vehicle in a convenient and undistracted manner. However, windshields of different vehicles have different curvatures that can affect the quality of display of the content provided to the operator of the vehicle. The present disclosure addresses these and other issues related to the display of content upon a windshield of a vehicle.

SUMMARY

This section provides a general summary of the disclosure and is not a comprehensive disclosure of its full scope or all of its features.

The present disclosure provides a method comprising: obtaining curve data associated with a surface; determining, by a display controller, a curve compensation corresponding to the curve data; and causing one or more images to be projected onto a portion of the surface by a plurality of display units associated with the display controller based on the curve compensation; further comprising: storing the curve data in a database associated with an electronic control unit separate from the display controller; transmitting, from the electronic control unit, the curve data to the display controller; and verifying, by the display controller, that the curve data corresponds to a radius associated with a curvature of the surface, wherein the determination of the curve compensation is based on the verification associated with the curve data; further comprising: storing the curve data in a first database; transmitting the stored curve data to a second database, wherein the first database and the second database are associated with the display controller; and verifying, by the display controller, that the curve data corresponds to a radius associated with a curvature of the surface, wherein the determination of the curve compensation is based on the verification associated with the curve data; wherein the portion of the surface reflects the one or more images; further comprising: causing perceivable content to be displayed to a user in response to the reflected one or more images; wherein the surface is a windshield of a vehicle and the user is a driver or a passenger of the vehicle; wherein each display unit of the plurality of display units includes a display screen, and wherein the display screen includes a display region; and wherein a size of the display region corresponds to the curve compensation.

The present disclosure provides a system comprising: a display controller configured to: obtain curve data associated with a surface, determine a curve compensation corresponding to the curve data, and cause one or more images to be projected onto a portion of the surface by a plurality of display units associated with the display controller based on the curve compensation; and a surface configured to: reflect, upon the portion of the surface, the one or more images; wherein the display controller is further configured to: store the curve data in a database associated with an electronic control unit separate from the display controller; transmit, from the electronic control unit, the curve data to the display controller; and verify, by the display controller, that the curve data corresponds to a radius associated with a curvature of the surface, wherein the determination of the curve compensation is based on the verification associated with the curve data; wherein the display controller is further configured to: store the curve data in a first database; transmit the stored curve data to a second database, wherein the first database and the second database are associated with the display controller; and verify, by the display controller, that the curve data corresponds to a radius associated with a curvature of the surface, wherein the determination of the curve compensation is based on the verification associated with the curve data; wherein the display controller is further configured to: cause perceivable content to be displayed to a user in response to the reflected one or more images; wherein the surface is a windshield of a vehicle and the user is a driver or a passenger of the vehicle; wherein each display unit of the plurality of display units includes a display screen, and wherein the display screen includes a display region; and wherein a size of the display region corresponds to the curve compensation.

The present disclosure provides one or more non-transitory computer-readable media storing processor-executable instructions that, when executed by at least one processor, cause the at least one processor to: obtain curve data associated with a surface; determine, by a display controller, a curve compensation corresponding to the curve data; and cause one or more images to be projected onto a portion of the surface by a plurality of display units associated with the display controller based on the curve compensation; wherein the at least one processor is further caused to: store the curve data in a database associated with an electronic control unit separate from the display controller; transmit, from the electronic control unit, the curve data to the display controller; and verify, by the display controller, that the curve data corresponds to a radius associated with a curvature of the surface, wherein the determination of the curve compensation is based on the verification associated with the curve data; wherein the at least one processor is further caused to: store the curve data in a first database; transmit the stored curve data to a second database, wherein the first database and the second database are associated with the display controller; and verify, by the display controller, that the curve data corresponds to a radius associated with a curvature of the surface, wherein the determination of the curve compensation is based on the verification associated with the curve data; wherein the portion of the surface reflects the one or more images, and wherein the at least one processor is further caused to: cause perceivable content to be displayed to a user in response to the reflected one or more images; and wherein each display unit of the plurality of display units includes a display screen, and wherein the display screen includes a display region, and further wherein a size of the display region corresponds to the curve compensation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
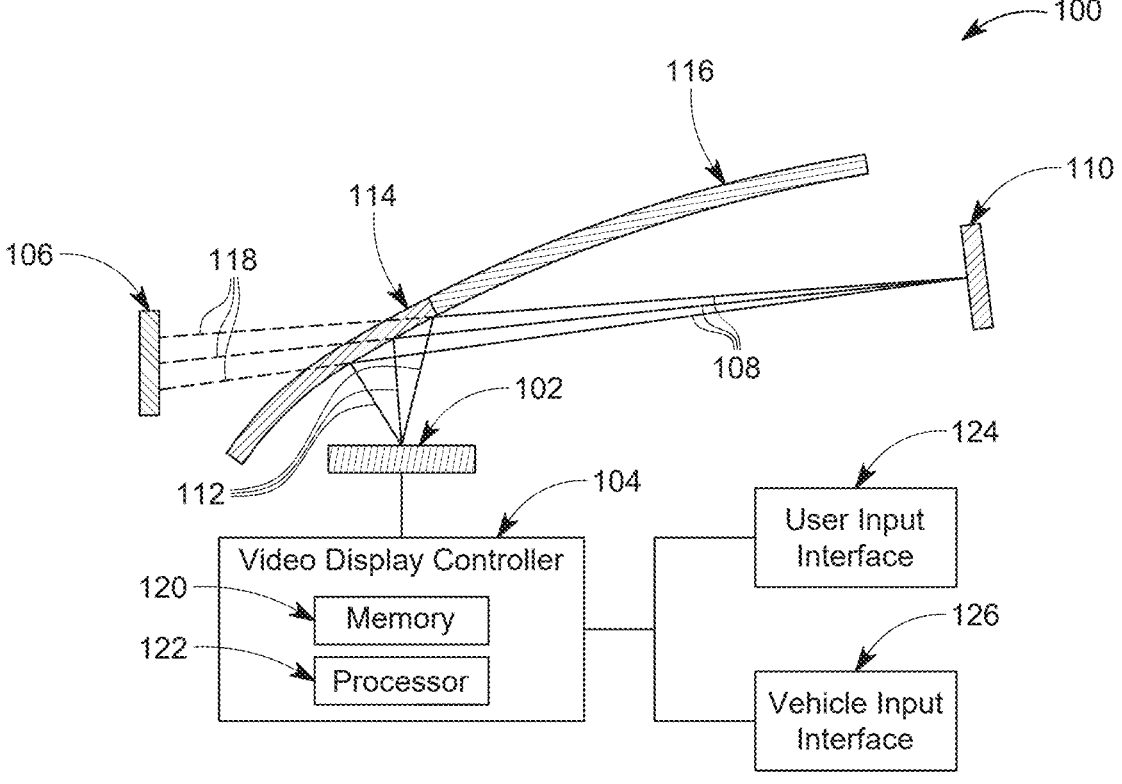
FIG. 1 is a side diagrammatic view of a content display environment in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more embodiments of the present disclosure provides systems and methods for displaying content on a surface (e.g., a windshield of a vehicle) based on an implementation of a machine learning-based compensation to the displayed content. There are many different types of windshields that can each have a different and/or unique curvature. It can be costly and inefficient for manufacturers to create a custom configuration of display units that project images onto the windshield for each unique curvature. Therefore, advantages of implementing one or more herein described embodiments including machine learning-based compensation to the displayed content provides for a standard configuration of the display units to consistently project the images across any windshield, thereby resulting in quality-controlled content perceivable by an operator of the vehicle.

Figure 2:
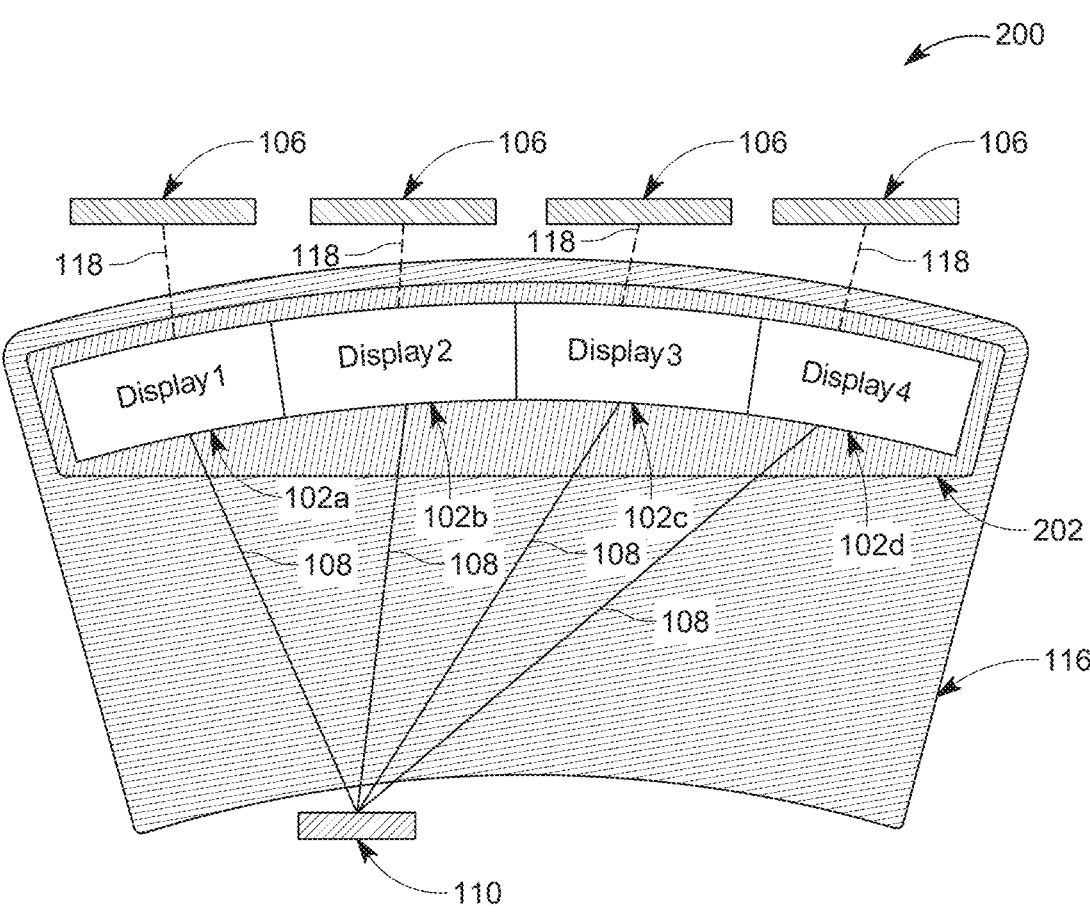
FIG. 2 is a top diagrammatic view of the content display environment of FIG. 1 in accordance with one or more embodiments of the present disclosure.
Figure 3:
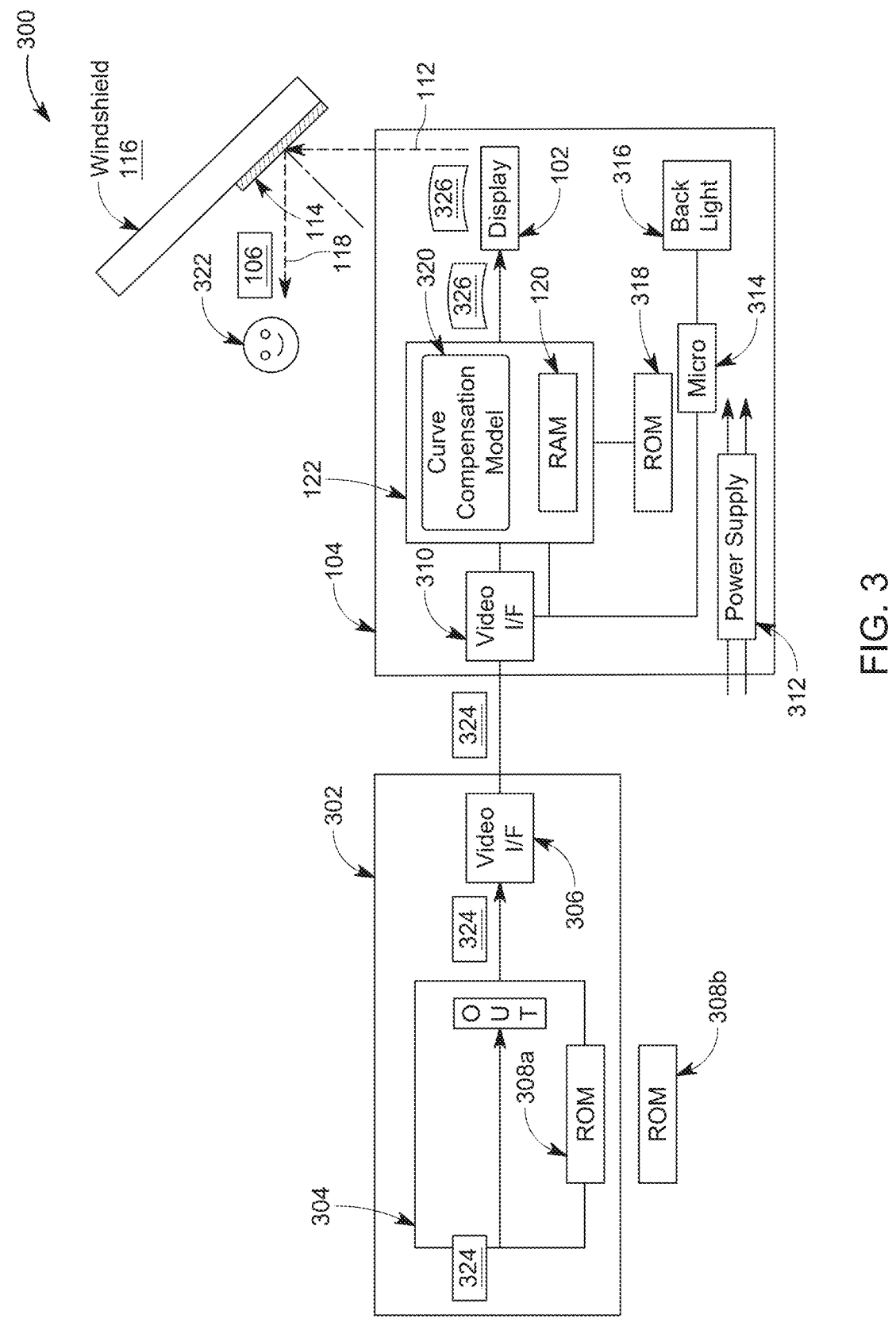
FIG. 3 is an example system associated with one or more content display processes in accordance with one or more embodiments of the present disclosure.

Referring to FIG. 1, an example display system 100 is shown and generally includes one or more display units 102 (e.g., a plurality of display units 102a-102d as shown in FIG. 2) and a video display controller 104. In some examples, the display system 100 is implemented within a vehicle (not shown) to project content 106 (e.g., images, text, etc.) perceivable by a user (e.g., a user 322 as shown in FIG. 3). It is understood that the projected content 106 being perceivable in one or more embodiments means that the projected content 106 can be understood or reasonably interpreted by the user 322 (e.g., displayed in an orientation that is readable by the user 322 viewing a windshield of the vehicle). It is also understood that the user 322 can be a human operator of the vehicle, a passenger of the vehicle, or any other person associated with the operation and/or occupation of the vehicle. It should be understood, however, that the display system 100 can be implemented within any general system wherein content may be projected to the user 322, such as a theater or classroom setting and is not limited to the examples described herein. In one or more examples, the projected content 106 can appear within an optical path 108 that originates from an eyebox 110 of the user 322 and represents at least a portion of a viewable range of the user 322. It is understood that the optical path 108 may vary based on the height of the eyebox 110 of the user 322 that can correspond (e.g., directly/indirectly) to a height of the user 322.

In one or more examples, one or more images is projected as a first light path 112 against a portion 114 (e.g., a display portion) of a surface 116 from the one or more display units 102. With particular reference to FIG. 2, an example system 200, in one or more embodiments, illustrates an implementation of the plurality of display units 102a-102d positioned over and along a dashboard 202. It is understood, however, that the plurality of display units 102a-102d can be integrated within the dashboard 202 as well. It is also understood that the example system 200, in one or more embodiments, can implement a single display unit (not shown) that spans the entirety of the dashboard 202.

Referring back to FIG. 1, and as is depicted in FIG. 2, the surface 116 is a windshield of the vehicle. However, it is understood that the surface 116 can be any surface upon which content can be projected. As another example, the portion 114 of the surface 116 is a solid color-blocked band near an edge of the surface 116 (e.g., along a bottom of the windshield) that may gradually dissolve into minimally-sized dots (e.g., a frit). As yet another example, the portion 114 of the surface 116 can be a painted enamel that can be any color. However, it is understood that the portion 114 of the surface 116 can be colored with any type of paint, material, or process. As a further example, and because the portion 114 of the surface 116 causes the projected one or more images to be reflected, an inversion of the projected one or more images occurs and causes the projected one or more images to be displayed so that the projected content 106 is perceivable to the user 322 (e.g., viewable in the correct orientation). In one or more embodiments, the inverted form of the projected one or more images is represented by a second light path 118.

In one or more embodiments, the video display controller 104 includes a memory 120 and a processor 122, wherein the processor 122 is configured to execute one or more instructions stored in the memory 120 to control an output of the display unit 102. It is understood that the processor 122 can represent an application specific integrated circuit (ASIC), a field programmable gate array and/or a system on chip that can contain one or more interfaces including, but not limited to, a video interface, an audio interface, and/or any other interface related to a processing capability associated with the vehicle. It is also understood that the processor 122 can represent any other processing integrated circuit. The video display controller 104 may control the display unit 102, and thereby cause the display unit 102 to project particular images and/or other data (or any content) based on the one or more instructions stored in the memory 120 and/or based on other inputs from the user 322. For example, a user input interface 124 and a vehicle input interface 126 may be used to provide one or more instructions to the video display controller 104 to control the display unit 102 based on user input (e.g., input from the user 322) and vehicle data/status, respectively. For example, user input to change a type of information displayed (e.g., to select between instrument data such as speed/RPM/etc. and navigation data such as turn directions), to select options when a graphical user interface is displayed, and/or to otherwise indicate preferences of the user 322 are provided to the video display controller 104 and processed to alter a content, height, and/or format of the displayed data. As an example, the content may be data (e.g., music files, video files, recorded sound waves, etc.). It is understood that the user input interface 124, in some examples, receives user input from any suitable user input device, including but not limited to a touch screen, vehicle-mounted actuators (e.g., buttons, switches, knobs, dials, etc.), a microphone (e.g., for voice commands), an external device (e.g., a mobile device of a vehicle occupant), and/or other user input devices.

The vehicle input interface 126 receives data from one or more vehicle sensors (not shown) and/or systems indicating a vehicle status and/or other vehicle data, which may be sent to the video display controller 104 to adjust content and/or format of the displayed data, in one or more embodiments. For example, a current speed may be supplied (e.g., via a controller-area network (CAN) bus of the vehicle) to the vehicle input interface 126 and sent to the video display controller 104 to update the display of a current speed of the vehicle. The vehicle input interface 126 may also receive input from a navigation module (not shown) of the vehicle and/or other information sources within the vehicle.

In one or more embodiments, and in consideration of the illustration depicted in FIG. 3, an electronic control unit 302 is generally shown as communicatively coupled (e.g., via a wired or wireless means) to the display controller 104. It is understood that the electronic control unit 302 can represent a head-unit, an in-vehicle infotainment controller, a cockpit domain controller, a domain controller, or a combination thereof. However, it is understood that the electronic control unit 302 can provide a capability associated with any image/video source related to the vehicle. The electronic control unit 302 can include a processor 304 and a video interface 306. It is understood that the processor 304 can represent a field programmable gate array, a graphics processing unit, a central processing unit, an application-specific integrated circuit, and/or a system on chip that can contain one or more interfaces including, but not limited to, a video interface, an audio interface, and/or any other interface related to a processing capability. However, it is understood that the processor 304 can represent any integrated circuit or other processing device having a data processing capability associated with the vehicle. It is also understood that the video interface 306 can represent a gigabit multimedia serial link, a gigabit video interface, or a flat panel display link. However, it is understood that the video interface 306 can represent any video-related interface associated with, or capable of transferring, one or more video files associated with the vehicle. The electronic control unit 302 can also include a read-only memory (ROM) 308a internally disposed relative to the processor 304 and/or a ROM 308b externally disposed relative to the processor 304. It is understood that the internally disposed ROM 308a and the externally disposed ROM 308b are collectively referred to as the ROM 308. It should be appreciated that the ROM 308a, 308b are merely an example of the type of memory or storage device that may be used.

The display controller 104 can include a video interface 310, a power supply 312, a micro-controller 314, a backlight 316, and a ROM 318. It is understood that the video interface 310 can represent a system on chip that can contain one or more interfaces including, but not limited to, a video interface, an audio interface, and/or any other interface related to a processing capability. It is also understood that the video interface 306 can represent a gigabit multimedia serial link, a gigabit video interface, or a flat panel display link. However, it is understood that the video interface 310 can represent any video-related interface associated with, or capable of transferring, one or more video files associated with the vehicle. The processor 122 can include a random-access memory (RAM) 120 (e.g., the memory 120), and a curve compensation model 320. The display controller 104 is configured to implement a functionality of each of the components of the display controller 104 (e.g., the video interface 310, the power supply 312, the micro-controller 314, the backlight 316, the ROM 318, the RAM 120, and/or the curve compensation model 320) to cause perceivable content to be displayed to the user 322 via the methods and/or systems described herein.

Figure 4:
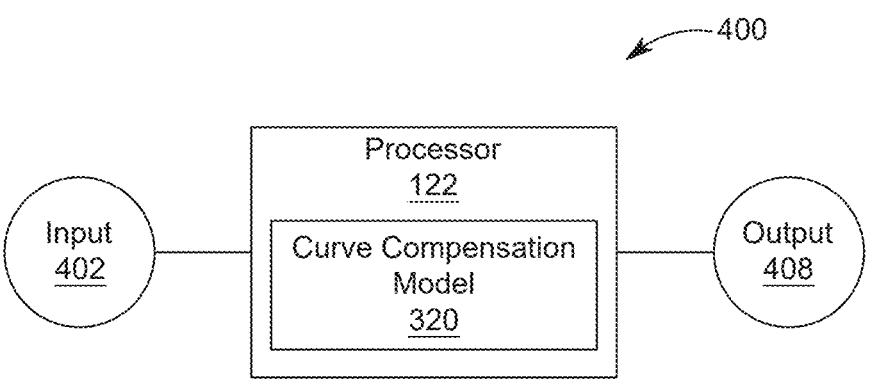
FIG. 4 is a block diagram of an example system for calculating a curve compensation associated with displaying content on a surface in accordance with one or more embodiments of the present disclosure.

In particular, a system 400 associated with the video display controller 104 is depicted in FIG. 4. In one or more examples, the one or more instructions stored in the memory 120 and/or the other inputs from the user 322 can be received as an input 402 by the processor 122 of the video display controller 104. In one or more examples, the one or more instructions and/or the other inputs are indicative of curve data associated with the surface 116. In one or more examples, the curve data can correspond to predetermined measurements associated with the curvature of the windshield 116, which can be based on a model identification number of the vehicle and/or the windshield 116. However, it is understood that the curve data can correspond to the curvature of the windshield 116 that may be provided via one or more vehicle sensors configured to determine the curvature of the windshield 116. In one or more examples, an unfiltered version of the one or more images 324 can be included as the input 402, as well as curve data that can correspond to the unfiltered version of the one or more images 324 and/or be an additional form of data related to the unfiltered version of the one or more images 324, as shown in FIG. 3.

In one or more embodiments, the input 402 is stored in the ROM 308 of the electronic control unit 302. The electronic control unit 302 is configured to transmit the input 402 to the display controller 104. The display controller 104 is configured to utilize the processor 122 to perform one or more verification processes to verify the curve data and whether the curve data corresponds to a radius associated with a curvature of the surface 116. In one or more examples, the curve data is verified as corresponding to the radius associated with the curvature of the surface 116 in a case wherein data points of the curve data match the coordinate data points of the radius. In another one or more examples, the curve data is verified as corresponding to the radius associated with the curvature of the surface 116 in a case wherein an acceptable deviation of the data points of the curve data from the coordinate data points of the radius is within a predefined range.

However, in another one or more embodiments, the input 402 can alternatively be stored in the ROM 318 of the display controller 104, after which point the input is transmitted to the RAM 120. The display controller 104 is configured to utilize the processor 122 to perform one or more verification processes to verify the curve data and whether the curve data corresponds to a radius associated with a curvature of the surface 116. In one or more examples, the curve data can be determined to correspond to the radius associated with the curvature of the surface 116 in a case wherein data points of the curve data match the coordinate data points of the radius. In another one or more examples, the curve data can be determined to correspond to the radius associated with the curvature of the surface 116 in a case wherein an acceptable deviation of the data points of the curve data from the coordinate data points of the radius is within a predefined range.

In these various examples (e.g., regardless of where the input 402 is initially stored), the verification process can serve as a basis for the curve compensation model 320 to determine a curve compensation that will correspond to the curve data (e.g., the input 402). In one or more examples, the curve compensation model 320 is configured to calculate a degree of compensation needed to consistently project the one or more images from the one or more display units 102 onto the surface 116 as an output 408. In one or more examples, the plurality of display units 102a-102d is assembled in a standard configuration regardless of a respective curvature of different surfaces. It is understood that different surfaces can have a wide range of respective curvatures, and as such, a consistent projection of the one or more images may not be accomplished without a form of compensation placed upon the projected one or more images, as is described herein. In other words, the calculation of the degree of compensation can cause the one or more images to be projected onto the portion 114 of the surface 116 (e.g., as the output 408) resulting in an identical, or similar, display perceivable to the user 322 regardless of the different curvatures of different surfaces. In one or more examples, the curve compensation can act as a filtering process that is configured to provide a filtered version of the one or more images 326 to be reflected against the portion 114 of the surface 116 via the first light path 112.

In one or more examples, the curve compensation model 320 can utilize one or more machine learning techniques to modify the one or more images 324 to correct for one or more distortions. For example, the physical configuration and/or capabilities of the one or more display units 102 can cause a geometric distortion to the projected content 106 while a photometric distortion can be caused by a material of the portion 114 of the windshield 116 or a quality of the projection of the content 106. As another example, the modification of the one or more images 324 can include filtering the one or more images and/or processing the one or more images. It is understood that each of the filtering and the processing of the one or more images can include, but is not limited to, resampling the one or more images, which includes adjusting a pixelation of the one or more images to adjust a size, quality, and/or shape of the projected content 106. In one or more examples, the one or more machine learning techniques can include, but is not limited to, deep learning (e.g., unsupervised or supervised) process, camera-projector pair, compenNeSt++, viComp, or a combination thereof. In one or more examples, the curve compensation model 320 can calculate the degree of compensation needed to fill the portion 114 of the surface 116 with a high quality resolution of the projected content 106, which can be based on a size of a display region (not shown) of each display unit of the one or more display units 102. It is understood that a high quality display can correspond to any level of resolution over 300 pixels per inch. However, it is understood that the high quality display can correspond to any level of pixelation. In one or more examples, the curve compensation model 320 can also rely upon a size of the portion 114 of the surface 116 as a basis for calculating the degree of compensation.

Figure 5:
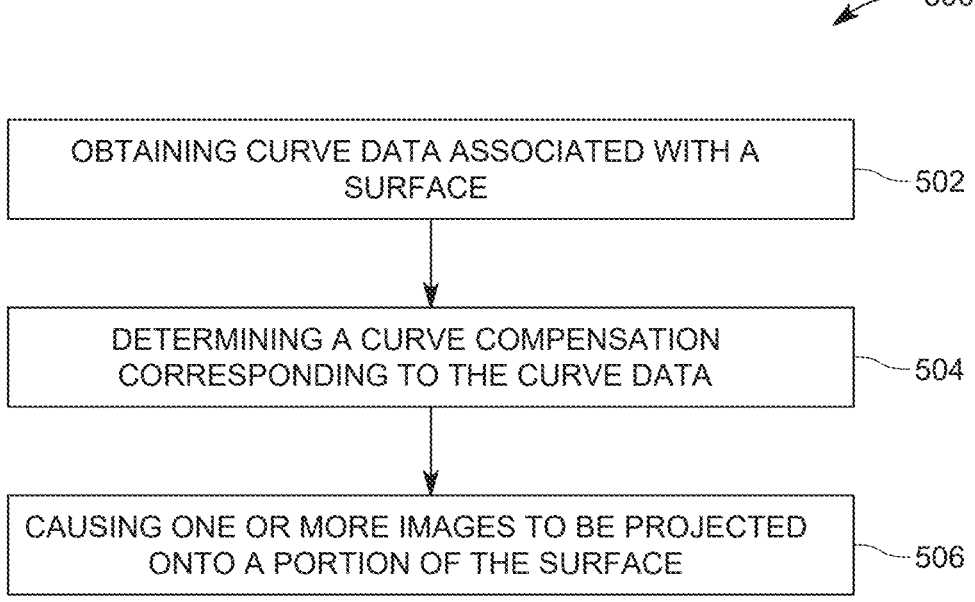
FIG. 5 is a flowchart illustrating an example method for calculating a curve compensation associated with displaying content on the surface in accordance with one or more embodiments of the present disclosure.

FIG. 5 is a flowchart illustrating an example method 500 for displaying content on a surface (e.g., the surface 116). At operation 502, curve data associated with the surface is obtained. For example, the curve data is obtained by an electronic control unit (e.g., the electronic control unit 302) and/or a display controller (e.g., the display controller 104).

At operation 504, a curve compensation is determined. In one or more examples, the curve compensation is determined by the display controller. As another example, the curve compensation corresponds to the curve data.

At operation 506, one or more images are caused to be projected onto a portion (e.g., the portion 114) of the surface. In one or more examples, the one or more images is projected onto the portion of the surface by a plurality of display units (e.g., the plurality of display units 102a-102d) associated with the display controller. For example, the projection of the one or more images is based on the curve compensation. In another example, the portion of the surface reflects the one or more images. As another example, the surface is a windshield of a vehicle and a user (e.g., the user 322) is a driver or a passenger of the vehicle. As yet another example, each display unit of the plurality of display units includes a display screen. As a further example, the display screen includes a display region. As an additional example, a size of the display region corresponds to the curve compensation.

In one or more embodiments, a database (e.g., the ROM 308) associated with the electronic control unit is configured to store the curve data. As an example, the electronic control unit is disposed separately from the display controller. The electronic control unit is configured to transmit the curve data to the display controller. The display controller is configured to verify that the curve data corresponds to a radius associated with a curvature of the surface. As an example, the determination of the curve compensation is based on the verification associated with the curve data.

In one or more embodiments, a first database (e.g., the ROM 318) is configured to store the curve data. The first data base is also configured to transmit the stored curve data to a second database (e.g., the RAM 120). As an example, the first database and the second database are associated with the display controller. The display controller is configured to verify that the curve data corresponds to a radius associated with the curvature of the surface. As an example, the determination of the curve compensation is based on the verification associated with the curve data.

In one or more embodiments, the display controller is configured to cause perceivable content to be displayed to the user. In one or more examples, the perceivable content is caused to be displayed to the user in response to the reflected one or more images. It is understood displayed content being perceivable in one or more embodiments means that the displayed content can be understood or reasonably interpreted by the user (e.g., displayed in an orientation that is readable by the user viewing the windshield of the vehicle).

Figure 6:
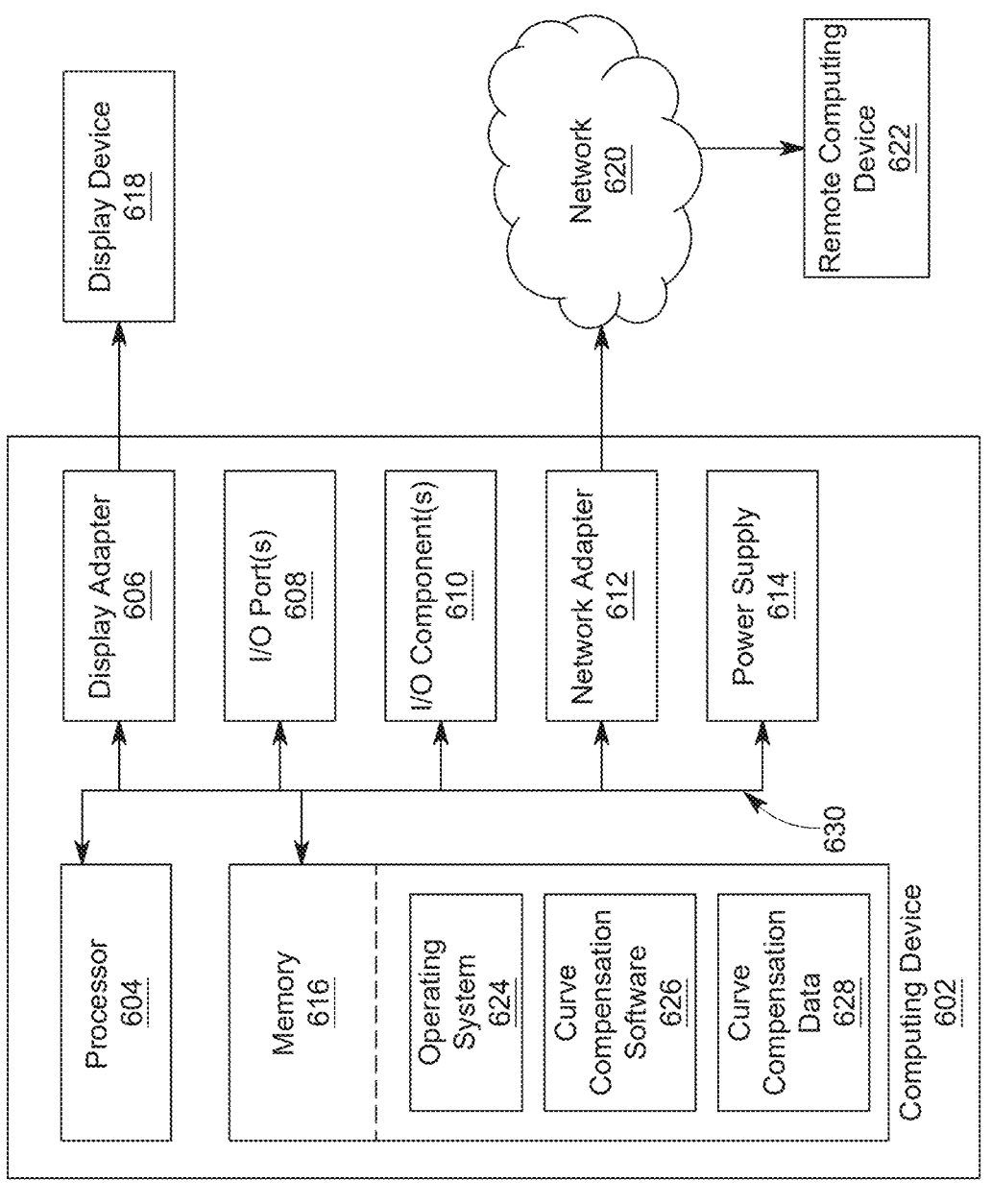
FIG. 6 is a block diagram illustrating an example computer system in accordance with one or more embodiments of the present disclosure.

FIG. 6 illustrates an operating environment, such as a computer system, that facilitates the performance of the one or more systems and methods described herein. More specifically, the systems and methods described herein can be implemented using a computing device 602. For example, the computing device 602 can be a personal computer, a desktop, a laptop, a tablet, a hand-held computer, a server, a workstation, a mainframe, a wearable computer, a super-computer, or a combination thereof. However, it is understood that the aforementioned examples of the computing device 602 is non-exhaustive and the computing device 602 can be any type of processing or computing device. The computing device 602 generally includes a processor 604, a display adapter 606, one or more input/output port(s) 608, one or more input/output component(s) 610, a network adapter 612, a power supply 614, and a memory 616. However, it is understood that the computing device 602 can include any additional components therein and is not required to include any of the listed components (e.g., the processor 604, the display adapter 606, the one or more input/output port(s) 608, the one or more input/output component(s) 610, the network adapter 612, the power supply 614, and the memory 616).

The processor 604 is configured to provide instructions to the computing device 602 so that the computing device 602 can process one or more tasks including the implementation of a software program to perform one or more operations as described in more detail herein. It is also understood that the computing device 602 may include any number or processors 604 therein. The display adapter 606 can be a graphics card or a video board that provides the computing device 602 with a capability to display content on a display device 618. For example, the display device 618 can be any screen, monitor, and/or light-emitting component associated with any of the personal computer, the desktop, the laptop, the tablet, the hand-held computer, the server, the workstation, the mainframe, the wearable computer, the supercomputer, or a combination thereof. However, it is understood that the aforementioned examples of the display device 618 is non-exhaustive and that the display device 618 can be any type of device capable of providing a visual display.

The input/output port(s) 608 provide a number of interfaces (e.g., sockets) for one or more cables to connect to the computing device 602. It is understood that there may be any number of input/output port(s) 608 on the computing device 602. For example, the input/output port(s) 608 provides a means for the computing device 602 to receive signals and/or data from an external device connected to the computing device 602 via the one or more cables. As another example, the input/output port(s) 608 provide a means for the computing device 602 to send signals and/or data to an external device connected to the computing device 602 via the one or more cables. The input/output component(s) 610 can include one or more components that support the input/output port(s) 608 such as, but not limited to, a switch, a push button, a pressure mat, a float switch, a keypad, a radio receive, or a combination thereof.

The network adapter 612 can be any type of network interface controller that is configured to provide a means for communicating over a network 620 with another computing device, such as a remote computing device 622. For example, the remote computing device 622 can be a user device such as a cellular-phone, a smartphone, a tablet, a laptop, or a combination thereof. The power supply 614 is configured to convert alternating high voltage current (e.g., AC) into direct current (e.g., DC) to provide power to the other components (e.g., the processor 604, the display adapter 606, the one or more input/output port(s) 608, the one or more input/output component(s) 610, the network adapter 612, and the memory 616) of the computing device 602.

Additionally, the memory 616 can be a mass storage device and/or a system memory such as a hard disk drive, a memory card, a solid-state drive, random access memory (RAM), or a combination thereof. The memory 616 is configured to provide storage for instructions and data associated with the operation of the computing device 602. The memory 616 can generally include an operating system 624, curve compensation software 626, and curve compensation data 628. For example, the operating system 624 is configured to manage and/or process any of the data and/or instructions associated with the curve compensation software 626 and/or curve compensation data 628, as described in more detail herein.

Furthermore, one or more system internal buses 630 is also included within the computing device 602 that is configured to couple each of the various components (e.g., the processor 604, the display adapter 606, the one or more input/output port(s) 608, the one or more input/output component(s) 610, the network adapter 612, the power supply 614, and the memory 616) of the computing device 602. It is also understood that each of the components of the computing device 602, and the functionality associated with each of the components of the computing device 602, may be implemented within the remote computing device 622. While the operating environment illustrated within FIG. 6 depicts a particular configuration associated with at least the computing device 602, the network 620, and the remote computing device 622, it is understood that the operating environment may be configured in any way.

Thus, one or more examples of the present disclosure provides a means for displaying content on a surface to accommodate for any curvature-related disparities between one or more display units and the surface, so that the displayed content perceived by a user is consistent despite different surfaces that may have different curvatures. In one or more examples, the accommodation is achieved by a calculation and application of a curve compensation, as is described herein.

Based on the foregoing, the following provides a general overview of the present disclosure and is not a comprehensive summary. In a first one or more embodiments A1, a method comprising obtaining curve data associated with a surface. Determining, by a display controller, a curve compensation corresponding to the curve data. Causing one or more images to be projected onto a portion of the surface by a plurality of display units associated with the display controller based on the curve compensation.

In a second one or more embodiments A2, which may include the first one or more embodiments A1, the method further comprising storing the curve data in a database associated with an electronic control unit separate from the display controller, transmitting, from the electronic control unit, the curve data to the display controller, and verifying, by the display controller, that the curve data corresponds to a radius associated with a curvature of the surface, wherein the determination of the curve compensation is based on the verification associated with the curve data. In a third one or more embodiments A3, which may include any combination of the first through second one or more embodiments A1-A2, the method further comprising storing the curve data in a first database, transmitting the stored curve data to a second database, wherein the first database and the second database are associated with the display controller, and verifying, by the display controller, that the curve data corresponds to a radius associated with a curvature of the surface, wherein the determination of the curve compensation is based on the verification associated with the curve data.

In a fourth one or more embodiments A4, which may include any combination of the first through third one or more embodiments A1-A3, the portion of the surface reflects the one or more images. In a fifth one or more embodiments A5, which may include any combination of the first through fourth one or more embodiments A1-A4, the method further comprising causing perceivable content to be displayed to a user in response to the reflected one or more images. In a sixth one or more embodiments A6, which may include any combination of the first through fifth one or more embodiments A1-A5, the surface is a windshield of a vehicle and the user is a driver or a passenger of the vehicle. In a seventh one or more embodiments A7, which may include any combination of the first through sixth one or more embodiments A1-A6, each display unit of the plurality of display units includes a display screen, and wherein the display screen includes a display region. In an eighth one or more embodiments A8, which may include any combination of the first through seventh one or more embodiments A1-A7, a size of the display region corresponds to the curve compensation.

In a ninth one or more embodiments A9, which may include any combination of the first through eighth one or more embodiments A1-A8, a system comprising a display controller configured to obtain curve data associated with a surface, determine a curve compensation corresponding to the curve data, and cause one or more images to be projected onto a portion of the surface by a plurality of display units associated with the display controller based on the curve compensation. The system also comprises a surface configured to reflect, upon the portion of the surface, the one or more images.

In a tenth one or more embodiments A10, which may include any combination of the first through ninth one or more embodiments A1-A9, the display controller is further configured to store the curve data in a database associated with an electronic control unit separate from the display controller, transmit, from the electronic control unit, the curve data to the display controller, and verify, by the display controller, that the curve data corresponds to a radius associated with a curvature of the surface, wherein the determination of the curve compensation is based on the verification associated with the curve data. In an eleventh one or more embodiments A11, which may include any combination of the first through tenth one or more embodiments A1-A10, the display controller is further configured to store the curve data in a first database, transmit the stored curve data to a second database, wherein the first database and the second database are associated with the display controller, and verify, by the display controller, that the curve data corresponds to a radius associated with a curvature of the surface, wherein the determination of the curve compensation is based on the verification associated with the curve data.

In a twelfth one or more embodiments A12, which may include any combination of the first through eleventh one or more embodiments A1-A11, the display controller is further configured to cause perceivable content to be displayed to a user in response to the reflected one or more images. In a thirteenth one or more embodiments A13, which may include any combination of the first through twelfth one or more embodiments A1-A12, the surface is a windshield of a vehicle and the user is a driver or a passenger of the vehicle. In a fourteenth one or more embodiments A14, which may include any combination of the first through thirteenth one or more embodiments A1-A13, each display unit of the plurality of display units includes a display screen, and wherein the display screen includes a display region.

In a fifteenth one or more embodiments A15, which may include any combination of the first through fourteenth one or more embodiments A1-A14, a size of the display region corresponds to the curve compensation.

In a sixteenth one or more embodiments A16, which may include any combination of the first through fifteenth one or more embodiments A1-A15, one or more non-transitory computer-readable media storing processor-executable instructions that, when executed by at least one processor, cause the at least one processor to obtain curve data associated with a surface, determine, by a display controller, a curve compensation corresponding to the curve data, and cause one or more images to be projected onto a portion of the surface by a plurality of display units associated with the display controller based on the curve compensation.

In a seventeenth one or more embodiments A17, which may include any combination of the first through sixteenth one or more embodiments A1-A16, the at least one processor is further caused to store the curve data in a database associated with an electronic control unit separate from the display controller, transmit, from the electronic control unit, the curve data to the display controller, and verify, by the display controller, that the curve data corresponds to a radius associated with a curvature of the surface, wherein the determination of the curve compensation is based on the verification associated with the curve data. In an eighteenth one or more embodiments A18, which may include any combination of the first through seventeenth one or more embodiments A1-A17, the at least one processor is further caused to store the curve data in a first database, transmit the stored curve data to a second database, wherein the first database and the second database are associated with the display controller, and verify, by the display controller, that the curve data corresponds to a radius associated with a curvature of the surface, wherein the determination of the curve compensation is based on the verification associated with the curve data.

In a nineteenth one or more embodiments A19, which may include any combination of the first through eighteenth one or more embodiments A1-A18, the portion of the surface reflects the one or more images, and wherein the at least one processor is further caused to cause perceivable content to be displayed to a user in response to the reflected one or more images. In a twentieth one or more embodiments A20, which may include any combination of the first through nineteenth one or more embodiments A1-19, each display unit of the plurality of display units includes a display screen, and wherein the display screen includes a display region, and further wherein a size of the display region corresponds to the curve compensation.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an ASIC; a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
obtaining curve data associated with a surface;
determining, by a display controller, a curve compensation corresponding to the curve data;
adjusting a pixelation of one or more images based on the curve compensation and a machine learning technique that corrects one or more distortions associated with the one or more images; and
causing the one or more images to be projected onto a portion of the surface by a plurality of display units associated with the display.

2. The method of claim 1, further comprising:
storing the curve data in a database associated with an electronic control unit separate from the display controller;
transmitting, from the electronic control unit, the curve data to the display controller; and
verifying, by the display controller, that the curve data corresponds to a radius associated with a curvature of the surface, wherein the determination of the curve compensation is based on the verification associated with the curve data.

3. The method of claim 1, further comprising:
storing the curve data in a first database;
transmitting the stored curve data to a second database, wherein the first database and the second database are associated with the display controller; and
verifying, by the display controller, that the curve data corresponds to a radius associated with a curvature of the surface, wherein the determination of the curve compensation is based on the verification associated with the curve data.

4. The method of claim 1, wherein the portion of the surface reflects the one or more images.

5. The method of claim 4, further comprising:
causing perceivable content to be displayed to a user in response to the reflected one or more images.

6. The method of claim 5, wherein the surface is a windshield of a vehicle and the user is a driver or a passenger of the vehicle.

7. The method of claim 1, wherein each display unit of the plurality of display units includes a display screen, and wherein the display screen includes a display region.

8. The method of claim 7, wherein a size of the display region corresponds to the curve compensation.

9. A system comprising:
a display controller configured to:
obtain curve data associated with a surface,
determine a curve compensation corresponding to the curve data;
adjust a pixelation of one or more images based on the curve compensation and a machine learning technique that corrects one or more distortions associated with the one or more images, and
cause the one or more images to be projected onto a portion of the surface by a plurality of display units associated with the display controller; and
a surface configured to: reflect, upon the portion of the surface, the one or more images.

10. The system of claim 9, wherein the display controller is further configured to:
store the curve data in a database associated with an electronic control unit separate from the display controller;
transmit, from the electronic control unit, the curve data to the display controller; and
verify, by the display controller, that the curve data corresponds to a radius associated with a curvature of the surface, wherein the determination of the curve compensation is based on the verification associated with the curve data.

11. The system of claim 9, wherein the display controller is further configured to:
store the curve data in a first database;
transmit the stored curve data to a second database, wherein the first database and the second database are associated with the display controller; and
verify, by the display controller, that the curve data corresponds to a radius associated with a curvature of the surface, wherein the determination of the curve compensation is based on the verification associated with the curve data.

12. The system of claim 9, wherein the display controller is further configured to:
cause perceivable content to be displayed to a user in response to the reflected one or more images.

13. The system of claim 12, wherein the surface is a windshield of a vehicle and the user is a driver or a passenger of the vehicle.

14. The system of claim 9, wherein each display unit of the plurality of display units includes a display screen, and wherein the display screen includes a display region.

15. The system of claim 14, wherein a size of the display region corresponds to the curve compensation.

16. One or more non-transitory computer-readable media storing processor-executable instructions that, when executed by at least one processor, cause the at least one processor to:
obtain curve data associated with a surface;
determine, by a display controller, a curve compensation corresponding to the curve data;

adjusting a pixelation of one or more images based on the curve compensation and a machine learning technique that corrects one or more distortions associated with the one or more images; and cause the one or more images to be projected onto a portion of the surface by a plurality of display units associated with the display controller.

17. The one or more non-transitory computer-readable media of claim 16, wherein the at least one processor is further caused to:

store the curve data in a database associated with an electronic control unit separate from the display controller;

transmit, from the electronic control unit, the curve data to the display controller; and verify, by the display controller, that the curve data corresponds to a radius associated with a curvature of the surface, wherein the determination of the curve compensation is based on the verification associated with the curve data.

18. The one or more non-transitory computer-readable media of claim 16, wherein the at least one processor is further caused to:

16 store the curve data in a first database;

transmit the stored curve data to a second database, wherein the first database and the second database are associated with the display controller; and verify, by the display controller, that the curve data corresponds to a radius associated with a curvature of the surface, wherein the determination of the curve compensation is based on the verification associated with the curve data.

19. The one or more non-transitory computer-readable media of claim 16, wherein the portion of the surface reflects the one or more images, and wherein the at least one processor is further caused to:

cause perceivable content to be displayed to a user in response to the reflected one or more images.

20. The one or more non-transitory computer-readable media of claim 16, wherein each display unit of the plurality of display units includes a display screen, and wherein the display screen includes a display region, and further wherein a size of the display region corresponds to the curve compensation.

* * * * *